UNITED STATES PATENT OFFICE.

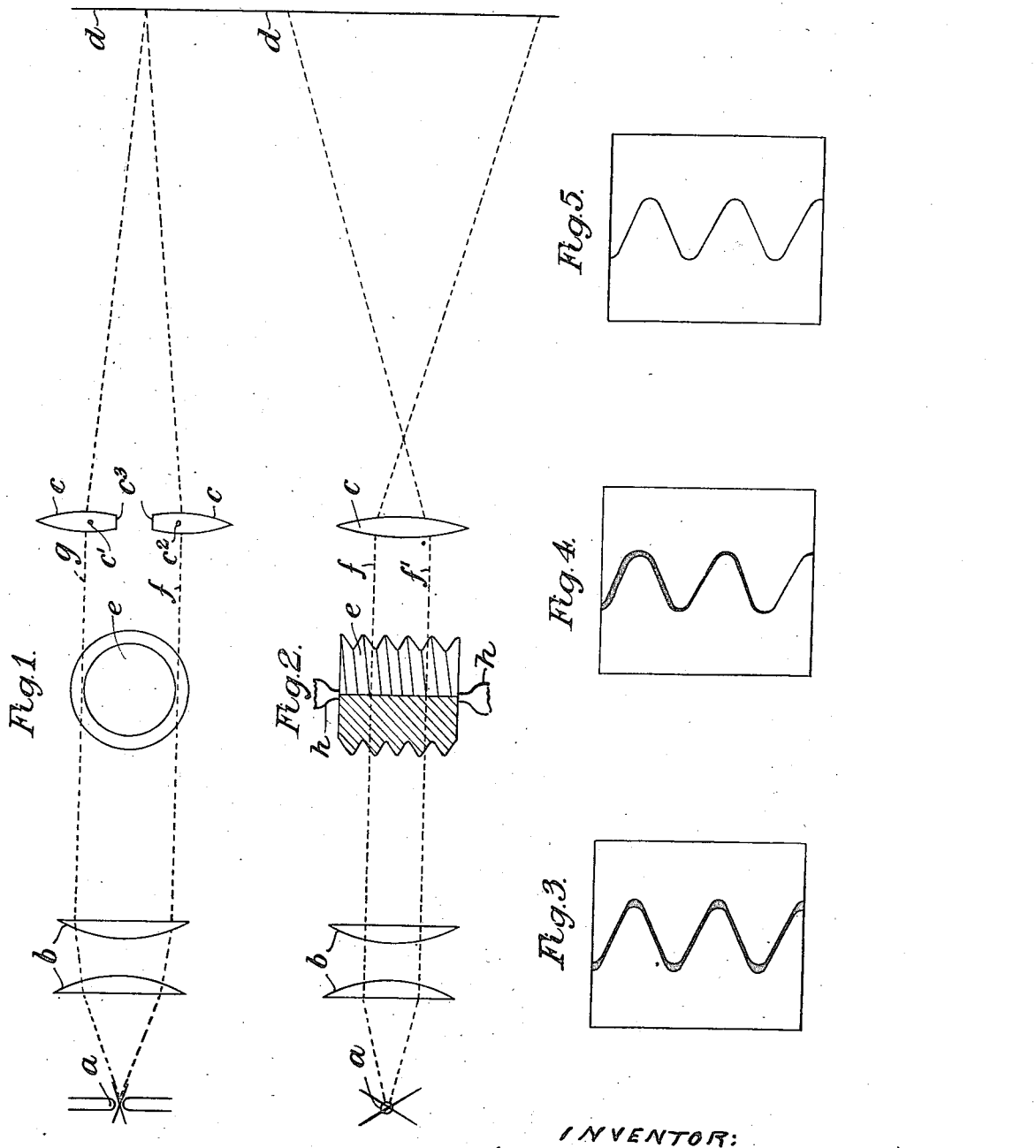

ARTHUR GEORGE COOKE, OF COUNTY OF MIDDLESEX, ENGLAND.

GAUGING APPARATUS.

1,424,556.

Specification of Letters Patent. Patented Aug. 1, 1922.

Application filed January 8, 1921. Serial No. 435,982.

(GRANTED UNDER THE PROVISIONS OF THE ACT OF MARCH 3, 1921, 41 STAT. L., 1313.)

*To all whom it may concern:*

Be it known that I, ARTHUR GEORGE COOKE, M. A., of 101 Brondesbury Road, in the county of Middlesex, England, a subject of the King of Great Britain and Ireland, have invented certain new and useful Improvements in Gauging Apparatus (for which I have obtained Letters Patent of Great Britain, No. 159,514, application No. 2442, filed February 19, 1917), of which the following is a specification.

For the purpose of checking small dimensions of bodies by comparison with the dimensions of a like standard body such as the diameters of cylinders or screws, I use a pair of lenses or optical combinations adapted to throw two silhouette images on a screen, the distance between centres of the optical combination being adjustable so as to project with enlargement two images simultaneously upon the screen. The invention is adapted for use in checking the measurement of certain bodies as hereinafter described.

By adjusting the distance between the centres of the lenses or optical combinations, the images of two different points, of parallel lines, or of two sets of points forming identical and parallel curves on an object may be superimposed or made to coincide, and on replacing the object by a second object to be measured or compared with the first object, minute differences in the distance between corresponding points in the two objects may be observed and measured.

In one method of carrying out this invention, as applied to gauging a screw, the images of two sides of a correct standard screw are projected as enlarged silhouettes so that the two silhouettes are superimposed but the light and dark sides are opposed, so that the screen is uniformly lighted. On replacing the standard by a screw to be tested, any excess in diameter appears as a dark zig-zag band, and any deficit as a similar light band. Lack of symmetry in form of thread is shown by irregular patches of light or dark.

The special value of my invention as applied to screw gauges lies in the fact that in all correct symmetrical forms of metal work screws, the distance between the surfaces measured through and at right angles to the axis is the same at all points. This distance is known as the effective diameter.

By shifting enlarged silhouette images of opposite sides of the screw transversely into coincidence it is possible to obtain coincidence at all points with a screw of correct form: and as the light and dark sides of the coinciding silhouettes will be opposed, the screen will be illuminated uniformly with half intensity, or grey.

The screw is illuminated by a parallel beam of light, obtained in the usual manner from an electric arc, or other concentrated source at the focal point of a condensing lens. If the screw be of a large diameter reflectors prismatic or other may be introduced to utilize rays from the source of equalized intensity on each side of the screw.

Referring to the drawings filed herewith:

Fig. 1 is a diagrammatic plan showing one arrangement of lenses or optical combinations adapted for carrying out this invention:

Fig. 2 is an elevation with the screw part in section:

Fig. 3 is an enlarged view showing the images of the two sides of a screw which is larger than the standard:

Fig. 4 is a similar view, where the screw being tested is irregular in form and, Fig. 5 is a similar view of a screw true to the standard.

$a$ is the source of light, $b$ a condenser, $c$ $c$ a pair of lenses, $d$ the screen and $e$ a standard screw or screw to be tested: $f$ and $g$ are two rays of light in plan and $f$ $f'$ are two rays in elevation: $c'$ and $c^2$ are the centres of the two lenses $c$ $c$.

The lenses $c$ $c$ may be ground away at $c^3$ to permit of the centres being brought close together for gauging small dimensions. The source of light is preferably an electric arc as the nearest approximation to a point of light.

In use, when it is desired to test a linear measurement with a given standard, say for instance, the effective diameter of a screw as compared with a standard screw. The standard screw is placed on the optical bench or stage, the lathe centers or holding portions of which are indicated at $h$ in Fig. 2, and the distance between the optical combination, or lenses or part lenses $c$ $c$ is adjusted by a micrometer screw or other means, so that their centres $c'$ $c^2$ are slightly less than the effective diameter of the screw by an amount sufficient to converge the rays from corresponding points to coincide on the screen. It will be understood, of course, that any suitable form of stage may be used, and I do not desire to limit my invention to any particular form.

The standard screw is then removed and the screws to be tested placed approximately in the same position. Excess in effective diameter will be indicated by a zigzag dark band of breadth proportional to the excess as shewn in Fig. 3 and deficit by a similar bright band illuminated with an intensity double of the uniform grey of the rest of the screen. Irregularities in symmetry will be indicated by light or dark bands or patches as shewn (for example) in Fig. 4, while a screw correct to standard will be shewn with a faint division as shewn in Fig. 5.

The distance, from the screen of the screw in Fig. 1 is much reduced to that which would be used in general practice giving a magnification of only 5 times so that the system shews excessive deviation and displacement of centres. A magnification of about 25 times is necessary to indicate errors of about .001 inch.

With the means and methods of carrying out this invention, great rapidity as well as accuracy of gauging screws, cylinders, and other objects can be obtained and this is of great value when a large number of similar objects have to be tested.

It is well known to project upon a screen by a pair of lenses or optical combinations two similar images, derived from separate objects, means being provided for adjusting the projecting parts so that the register is effective. It is obvious that similar and identical outlines in two objects (e. g. negatives) projected would thereby be caused to coincide but the arrangement did not admit of using these systems for gauging by silhouette coincidence, nor was such a use proposed. It is obvious that if a dimension is to be gauged by my silhouette coincidence method, the two silhouettes must be derived from different parts of the same object and in the prior arrangements referred to such a body could not have been inserted in the apparatus.

What I claim and desire to secure by Letters Patent is:—

1. A screw-gauging apparatus comprising a stage on which the screw may be supported, a screen, and means for producing and projecting enlarged images of different threads of such screw in overlapping relation on said screen.

2. A screw-gauging apparatus comprising a chart or screen, a stage for supporting a screw, a source of light, and a plurality of spaced lenses all arranged to project the images of different portions of the helix of the screw on the chart or screen in superposed relation.

3. A screw-gauging apparatus comprising a chart or screen, a stage for supporting a screw, a source of light, and a plurality of lenses arranged to project portions of opposite sides of the screw on the chart or screen in superimposed relation.

In testimony whereof I have signed my name to this specification.

ARTHUR GEORGE COOKE.